(12) United States Patent
Ahmed (10) Patent No.: US 8,295,249 B2
(45) Date of Patent: Oct. 23, 2012

(54) BLOCK SIZE DETECTION FOR MPSK SIGNALING

(75) Inventor: Walid Ahmed, Eatontown, NJ (US)

(73) Assignee: Alcatel Lucent, Paris (FR)

( * ) Notice: Subject to any disclaimer, the term of this patent is extended or adjusted under 35 U.S.C. 154(b) by 3087 days.

(21) Appl. No.: 10/126,699

(22) Filed: Apr. 22, 2002

(65) Prior Publication Data

US 2003/0198253 A1 Oct. 23, 2003

(51) Int. Cl.
*H04B 7/216* (2006.01)
(52) U.S. Cl. .......................... 370/335; 370/342; 370/470
(58) Field of Classification Search .................. 370/470, 370/465, 437, 335, 394, 278, 329, 395.4, 370/342, 441, 446; 455/67.11, 67.13, 63.1, 455/69, 452, 522, 562.1, 442; 375/279, 272, 375/140
See application file for complete search history.

(56) References Cited

U.S. PATENT DOCUMENTS

| | | | | |
|---|---|---|---|---|
| 5,509,020 A * | 4/1996 | Iwakiri et al. | ................ | 714/704 |
| 6,792,041 B1 * | 9/2004 | Kim et al. | ..................... | 375/225 |
| 6,934,321 B2 * | 8/2005 | Sato | ............................... | 375/150 |
| 7,072,926 B2 * | 7/2006 | Nagata et al. | ................. | 708/277 |
| 2002/0077141 A1 * | 6/2002 | Hwang et al. | ................. | 455/522 |
| 2003/0157900 A1 * | 8/2003 | Gaal et al. | ....................... | 455/69 |
| 2003/0174675 A1 * | 9/2003 | Willenegger et al. | ......... | 370/335 |
| 2003/0174676 A1 * | 9/2003 | Willenegger et al. | ......... | 370/335 |
| 2003/0174686 A1 * | 9/2003 | Willenegger et al. | ......... | 370/342 |

FOREIGN PATENT DOCUMENTS

WO    WO 01/24465 A1 * 5/2001

OTHER PUBLICATIONS

Akhtar, Saleem et al; "Capacity Evaluation of the UTRA WCDMA Interface"; 1999; IEEE; pp. 914-918.*
Ahmed, Walid; "Block-Size Estimation and Application to BTFD for 3GPP UMTS"; 2001; IEEE; pp. 3045-3049.*
Ahmed, Walid; "Maximum-Likelihood Block-Size Detection for MPSK Signaling"; May 2002; IEEE Transactions on Vehicular Technology; vol. 51, No. 3, pp. 511-525.*

* cited by examiner

*Primary Examiner* — Robert Scheibel
(74) *Attorney, Agent, or Firm* — Harness, Dickey & Pierce

(57) ABSTRACT

A data transmission includes a sequence of information symbols followed by zero or more non-information symbols, which carry no power. A receiver determines the size of a data block, i.e., the number of information symbols in the transmission, by calculating a series of transition indicators. Each transition indicator represents a likelihood that a particular symbol position corresponds to a transition between the information symbols and non-information symbols of the transmission.

18 Claims, 5 Drawing Sheets

DPDCH = DEDICATED PHYSICAL DATA CHANNEL (DATA1 AND DATA2 BITS)
DPCCH = DEDICATED PHYSICAL CONTROL CHANNEL (TPC, TFCI AND PILOT BITS)
TFCI = TRANSPORT FORMAT COMBINATION BITS
TPC = TRANSMIT POWER CONTROL BITS
PILOT = PILOT BITS

FIG. 7

BLOCK SIZE DETECTION FOR MPSK SIGNALING

FIELD OF THE INVENTION

The present invention relates to the estimation of the size of a received frame of data in M-ary Phase Shift Keying (MPSK) signaling.

DESCRIPTION OF THE RELATED ART

In third-generation wideband code-division multiple access (3G-WCDMA) systems, such as Universal Mobile Telecommunications Service (UMTS), several transport channels are multiplexed and then mapped onto a physical channel for transmission. Each transport channel is separately processed through CRC padding, channel coding, etc., before multiplexing. Each transport channel has an associated Transport Format (TF), which is defined by higher layers. Transport channels are multiplexed according to some Transport Format Combination (TFC).

At the receiver, the format of each transport channel must be detected. In order to detect the transport format, standards were established by the 3rd Generation Partnership Project (3GPP), which comprises a number of telecommunications standards bodies. The 3GPP standards specify two methods for such detection. The first is by transmitting a Transport Format Combination Indicator (TFCI). The other method is by Blind Transport Format Detection (BTFD), which is used when no TFCI is transmitted.

Examples of services for which TFCI may not be sent are speech or low-rate data applications. For such services, BTFD is applied to one or more transport channels, which are called "guiding channels." The block-sizes of all implicitly detected transport channels are determined via some one-to-one mapping technique.

SUMMARY OF THE INVENTION

The present invention provides a novel method for block-size detection for M-ary Phase Shift Keying (MPSK) signaling. One exemplary embodiment is directed to "aided" block-size detection based on the assumption that whenever the transmitter changes the block-size, it would send a training pattern specific to the new block-size. (The training pattern may also be used for channel estimation and synchronization purposes.) In this embodiment, the receiver does not know which training pattern has been sent. However, the training pattern has a one-to-one mapping with respect to the actual block-size of packets to follow the training sequence, and the receiver knows what training patterns to expect for every possible block-size value.

In aided detection, the receiver is aware of the possible training pattern that can be transmitted. Each training pattern includes a number L' of known symbols followed by a series of zero-power symbols. Since each possible training pattern has a different value L', the receiver calculates a likelihood for each possible value of L'. The receiver determines the transmitted training pattern as the possible training pattern corresponding to the highest calculated likelihood. The actual block size of the transmitted data is then determined as the block-size mapped to the determined training pattern.

Another exemplary embodiment is directed to "un-aided" detection. In this embodiment, the receiver only knows that the maximum block-size is $L_{max}$, and that if the block length L is less than $L_{max}$, the transmitter has filled the remaining space by turning transmission off, i.e., transmitting a zero-power signal. A likelihood value is calculated for each of a series of transmitted symbols. The likelihood value indicates the probability that the transmitted symbol is the $L^{th}$ transmitted signal, i.e., that that the next transmitted symbol is the first zero-power symbol in the data transmission. The receiver determines the actual block size L by determining the placement of the symbol associated with the highest calculated likelihood value.

BRIEF DESCRIPTION OF THE DRAWINGS

The present invention will become more fully understood from the detailed description given below and the accompanying drawings, which are given for purposes of illustration only, and thus do not limit the present invention.

DETAILED DESCRIPTION OF THE INVENTION

In an exemplary embodiment of the present invention, a transmitted (e.g., post-encoder) block will take on the form:

$$x = [x_1, x_2, \ldots, x_L, \underbrace{0, 0, \ldots 0}_{L_{max}-L}], \tag{1}$$

where $x_i$; i=1, ..., L, is the ith transmitted symbol, and $L \in \{L_1, L_2, \ldots, L_k, \ldots, L_K = L_{max}\}$ is the size (or length) of the transmitted block. Also, $L_{max}$ is the total packet size, with $L_k$ being the length of the "actual-information" period, in which information symbols are transmitted. During a power-off period, $L_{max} - L_k$, non-information symbols are transmitted, which carry neither information nor power. Also, $L_1 < L_2 < \ldots < L_k < \ldots < L_K = L_{max}$. Finally, it is assumed that a transmitted symbol $x_i$; i=1, ..., L, belongs to an MPSK signal constellation. That is, $x_i$ takes on the form:

$$x_i = A \exp(-j2\pi m/M); m=0,1, \ldots (M-1). \tag{2}$$

As inferred from eq. (1), if the block length, L, is less than $L_{max}$, the remaining $L_{max}-L$ positions are filled with zero-power symbols. Filling the rest of the transmitted frame with zeros is required since the transmitted frame has to have a constant length equal to $L_{max}$, which is usually determined by the specifications of the communications system being used, such as in UMTS. Also, filling with zeros saves power. Finally, the "no-power" interval provides a "power-level drop", which will be exploited by the receiver according to the method of the present invention to distinguish the end of the actual data block, as will be shown in the following description.

In a WCDMA system, the received signal is multipath fading with additive white Gaussian noise AWGN. In order to demodulate the received signal, the receiver utilizes a RAKE device, which resolves the multipaths. Then, maximum-ratio combining (MRC) is applied to optimally combine the resolved paths in order to achieve the best possible diversity gain. It is easy to show that the combined signal in this case is modeled as flat fading with AWGN. Hence, the value of the ith received symbol, $y_i$; $i=1, \ldots, L_{max}$, is equal to:

$$y_i = \alpha_i x_i + w_i, \quad (3)$$

where $x_i=0$ for $i=(L+1), \ldots, L_{max}$. Here, $\alpha_i$ are complex-valued fading variables, which are assumed to be known to the receiver via some well-known channel estimation technique. For example, in 3GPP UMTS, pilot symbols are continually transmitted over a control channel. Such pilot symbols are used by the receiver to accurately estimate the channel via some well-known "pilot-symbol-aided'" technique. Finally, $\omega_i$ is one of a set of independent identically distributed (IID) complex-valued AWGN variables, each with variance $\sigma_W^2$. It should be noted that the assumption of time-independent fading variables reflects the effect of interleaving, which is a common technique to combat burst errors due to long periods of deep fades.

The signal-to-noise ratio (SNR) can be expressed as:

$$SNR_k = \frac{L_k A^2}{2 L_{max} \sigma_W^2}; k = 1, \ldots, K. \quad (4)$$

where k represents the "mode-index".

Now let $y = \lfloor y_1, y_2, \ldots, y_{L_{max}} \rfloor$ denote the received block, $\alpha = \lfloor \alpha_1, \alpha_2, \ldots, \alpha_{L_{max}} \rfloor$ denote the complex-valued fading vector and $w = \lfloor w_1, w_2, \ldots, w_{L_{max}} \rfloor$ denote the complex-valued AWGN vector. Accordingly, the channel transition probability density function (pdf), $p(y|x,\alpha)$, is $$p(y \mid x, \alpha) = \frac{1}{(2\pi\sigma_W^2)^{L_{max}}} \exp\left(-\frac{1}{2\sigma_W^2} \sum_{i=1}^{L_{max}} |y_i - \alpha_i x_i|^2\right). \quad (5)$$

Aided Maximum-Likelihood Block-Size Detection

In an exemplary aided block-size detection embodiment according to the present invention, the receiver is aware of what transmitted (training) pattern to expect for each possible "data" block-size, $L_k$; $k=1, \ldots, K$. That is, the receiver is aware of the possible training patterns that can be transmitted, and the receiver is aware of the one-to-one mapping relationship between the training patterns and the corresponding data block-sizes. Hence, if the receiver detects that a certain pattern has been transmitted, it immediately knows what the corresponding data block-size is.

Block-size changes may, for example, be allowed only at known instants, or the transmitter may signal a block-size change by setting a one-bit flag, which can be transmitted, for example, over a separate control channel. Another possibility is that the training sequence is transmitted for every block. In fact, one may think of many ways to design and transmit training patterns within a transmitted block, or a set of transmitted blocks. In general, the aided-detection embodiment can easily be extended to any scenario. An exemplary embodiment of a training pattern transmission scenario is described as follows.

For each transmitted data block, a training sequence is attached at the beginning of the block. The training sequence can be used for both channel estimation and synchronization as well as for the purpose of block-size detection. If the data block-size is usually constant for several consecutive blocks, the transmitter may, for example, send only one training sequence, in the beginning, for the data blocks to follow. Then, upon change of the block-size value, the transmitter may send a one-bit flag, on some control channel, to signal that a new block-size will take place for the upcoming blocks. Accordingly, the receiver prepares for the reception of a new training sequence that will be used to detect the new data block-size for the blocks to follow, and so on.

As a format for the training sequences to be transmitted, we choose training patterns that have a structure similar to that described by eq. (1). That is, the training pattern includes L' known symbols and then $L'_{max}$ zero-power symbols. Here, L' and $L'_{max}$ are proportional to the actual data block-sizes L and $L_{max}$, but not necessarily equal. In other words, there is a one-to-one mapping between a data block-size L and its corresponding training sequence length, L'. Clearly, L'<L and $L'_{max} < L_{max}$ for an efficient design.

According to the aided-detection scenario discussed above, a maximum-likelihood (ML) detection algorithm should maximize p(y'|x',α'), similar to that defined in eq. (5), where in this case, x' is the vector of the transmitted training symbols, not the actual data block. Also, y' is the vector of received training symbols, and α' is the vector of the associated fading variables. Equivalent to the maximization of p(y'|x',α'), the ML detector can be used to maximize a transition indicator $\mathcal{L}^{aided}$, which represents a transition within a data transmission between information symbols and non-information symbols. The transition indicator $\mathcal{L}^{aided}$ is calculated according to a log-likelihood function defined as:

$$\mathcal{L}^{aided} \propto \log p(y' \mid x', \alpha') = -\sum_{i=1}^{L'_{max}} |y'_i - \alpha'_i x'_i|^2. \quad (6)$$

Assume that for each possible training sequence with L'; $L' \in \{L'_1, L'_2, \ldots, L'_k, \ldots, L'_K = L'_{max}\}$, the non-zero-power training sequence is $X_k$; $X_k \in \{X_1, X_2, \ldots, X_K\}$, where $X_k = [\xi_{1,k}, \xi_{2,k}, \ldots, \xi_{L'_k,k}]$; $k=1,2,\ldots K$; $\xi_{n,k}$ being the nth expected symbol in the $k^{th}$ training sequence.

Figure 1:
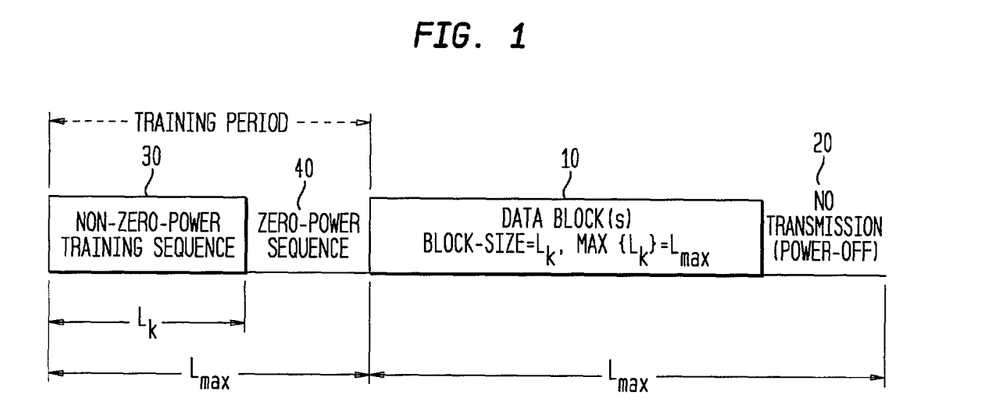
FIG. 1 illustrates an example of a frame structure for an aided block-size detection embodiment according to the present invention.

The value k represents the mode-index. The kth mode corresponds to the data block size $L_k$. The frame structure corresponding to the kth mode for the aided-detection embodiment is illustrated in FIG. 1. The first portion of the frame comprises a training period, which includes a training sequence 30 of $L'_k$ known symbols followed by a sequence 40 of zero-power symbols. The data block 10, comprising $L_k$ information symbols, is transmitted after the training period. This is followed by a power-off period 20, which includes a series of zero-power, non-information symbols. The number of non-information symbols = $L_{max} - L_k$.

Figure 2:
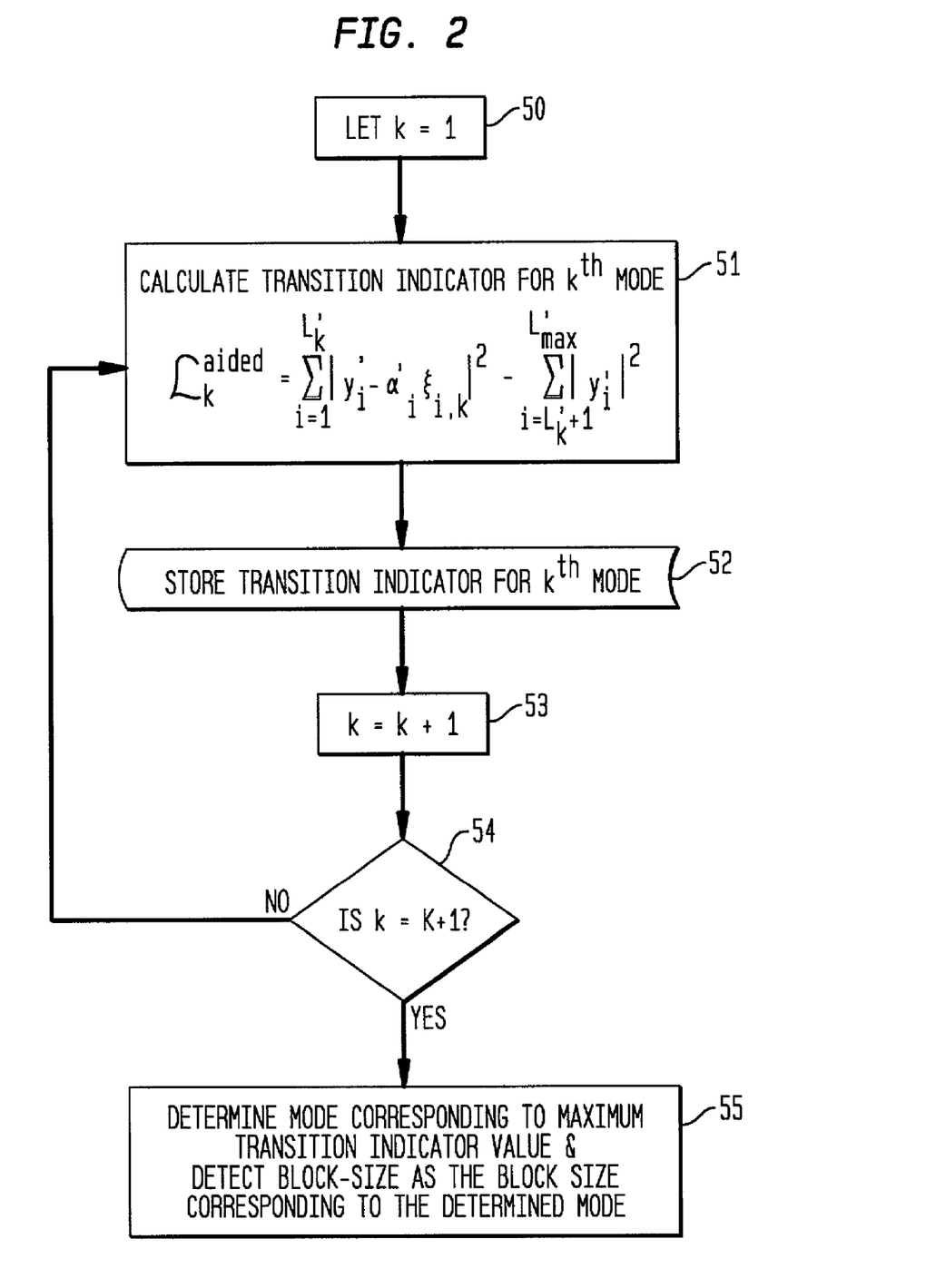
FIG. 2 is a flowchart of a method for the aided block-size detection embodiment.

FIG. 2 illustrates a procedure implementing a ML detection algorithm for the aided detection case, which is implemented by the data receiver. The procedure begins in step 50 with the first mode (k=1). In step 51, the transition indicator is calculated for the kth mode according to the following log-likelihood function:

$$\mathcal{L}_k^{aided} = -\sum_{i=1}^{L'_k} |y'_i - \alpha'_i \xi_{i,k}|^2 - \sum_{i=L'_k+1}^{L'_{max}} |y'_i|^2. \quad (7)$$

The transition indicator for each mode is stored in step 52. Next, the mode-index k is incremented by one (step 53). Decision block 54 determines whether the transition indicator for each of the K possible modes has been calculated and stored. If not, the procedure returns to step 51.

If each of the K transition indicators has been calculated, step 55 is performed. In this step, the stored transition indicator values are compared, and the maximum value is determined. The mode corresponding to the maximum transition indicator is determined as the mode of the transmitted training pattern. The data block size is then easily determined at this point, because each mode k has a one-to-one correspondence to a data block size $L_k$.

One possibility for the design of the non-zero-power portion of the training sequence is to transmit the "all-ones" pattern, i.e., $\{1,1,1,\ldots,0,0,0,\ldots\}$, where the number of ones in the sequence corresponding to the kth data block-size (i.e., with mode-index k) is equal to $L'_k$ and the number of zeros is equal to $L'_{max}-L'_k$.

Actually, the all-ones pattern represents the worst case scenario since it yields the minimum Euclidean distance between the blocks with adjacent mode-indexes (in this case, the Euclidean distance between the all-ones pattern of $L'_k$ and that of $L'_{k\pm1}$ is simply $(L'_k-L'_{k\pm1})$. If the non-zero-power portions of the training patterns are, for example, pseudo-randomized (with 1's and −1's, instead of all-ones), larger Euclidean distances among adjacent patterns can be obtained. Hence, the training patterns are less likely to be mistaken for each other, when applying the likelihood metric in eq. (7), due to noise and fading corruption. Thus, the performance will even be better than the all-ones case.

Now by careful examination of the detection algorithm described above, one can see that for the all-ones pattern, the performance of the ML detection algorithm does not really depend on the actual, or the absolute values of the lengths of the non-zero-power portions of the training sequences, i.e., the $L'_k$; k=1, ..., K. Rather, the performance of the algorithm only depends on the "differences" between such lengths, i.e., on $\Delta_j = L'_j - L'_{j+1}$; j=1, ..., K−1. Hence, one simple way to design training sequences that have a one-to-one relationship with the actual block-size values of the transmitted data, is to compose all-ones sequences for which $$\Delta_j = L'_j - L'_{j+1} = L_j - L_{j+1}; j=1, \ldots, K-1. \quad (8)$$

Figure 4:
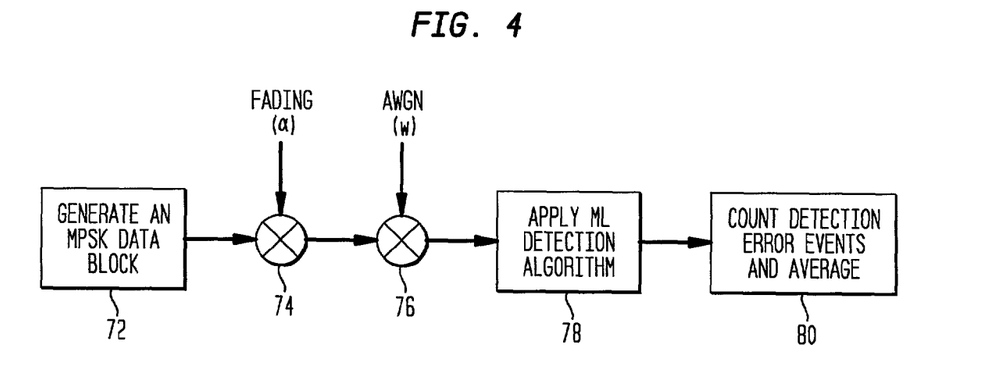
FIG. 4 is a block diagram illustrating a process for determining the average detected error probabilities of an implementation of aided block-size detection.

Another possible way to design training sequences with all-ones is to choose a constant $\Delta_j = C$, where C is chosen according to some performance criterion, e.g., such that a certain detection error probability is achieved. FIG. 4 is a block diagram illustrating a process by which the average detected error probabilities for each value C can be determined.

A test set of MPSK data blocks are generated in block 72. Fading 74 and AWGN 76 are generated and applied to the transmitted data stream as shown. The aided detection algorithm utilizing constant C is then applied to each received block, as shown in 78, and error counters are used to record the detection error events, according to step 80.

At the end of the simulation time, all error counters have been divided by the total number of trials in order to obtain the average detection error probability corresponding to C. The process can be repeated for a plurality of candidate values of C. Accordingly, the value C of $\Delta_j$ can be determined according to its associated average detection error probability.

Non-Aided Maximum Likelihood Block-Size Detection

In the non-aided block-size detection embodiment, no training sequence is transmitted. Only the data block is transmitted. In this embodiment, the receiver is not aware of the content or size of transmitted data. Nor does the receiver know the phases of the transmitted symbols. However, the receiver knows that the maximum data block-size is $L_{max}$, and that if the block length is less than $L_{max}$, the transmitter has filled the remaining space with non-information symbols by turning transmission off.

In an exemplary embodiment, the receiver knows the power level in the "on" state, or equivalently, the magnitude of the received symbols in the "on" state, which will be denoted A. Wireless receivers implement signal-to-noise ratio as well as noise-power estimation techniques, which are usually based on monitoring known pilot signals transmitted by the other party (i.e., base-station to mobile and vice versa) for various purposes such as soft-handoff management, etc. Hence, signal power levels are possible to estimate at the receiver, as the ratio of the signal power to the pilot power is usually known to the receiver via control-information channels.

Consequently, a maximum-likelihood (ML) detection algorithm should maximize $p(y/|x|,\alpha)$, instead of $p(y|x,\alpha)$ for the aided detection case. Hence, for MPSK signaling, and assuming that all phases occur with equal probabilities, the ML algorithm needs to maximize $$p(y/|x|, \alpha) = \prod_{i=1}^{L_{max}} \left[ \frac{1}{2\pi M \sigma_W^2} \sum_{m=0}^{M-1} \exp\left(-\frac{1}{2\sigma_W^2} |y_i - \alpha_i |x_i| e^{-j2\pi m/M}|^2\right) \right], \quad (9)$$

where $|x_i| \in \{0,A\}$. Equivalently, the ML detection algorithm can maximize the transition indicator defied here as:

$$\mathcal{L}^{non-aided} \propto \log p(y/|x|, \alpha) = \quad (10)$$

$$\sum_{i=1}^{L_{max}} \log\left[\sum_{m=0}^{M-1} \exp\left(-\frac{1}{2\sigma_W^2} |y_i - \alpha_i |x_i| e^{-j2\pi m/M}|^2\right)\right].$$

Figure 3:
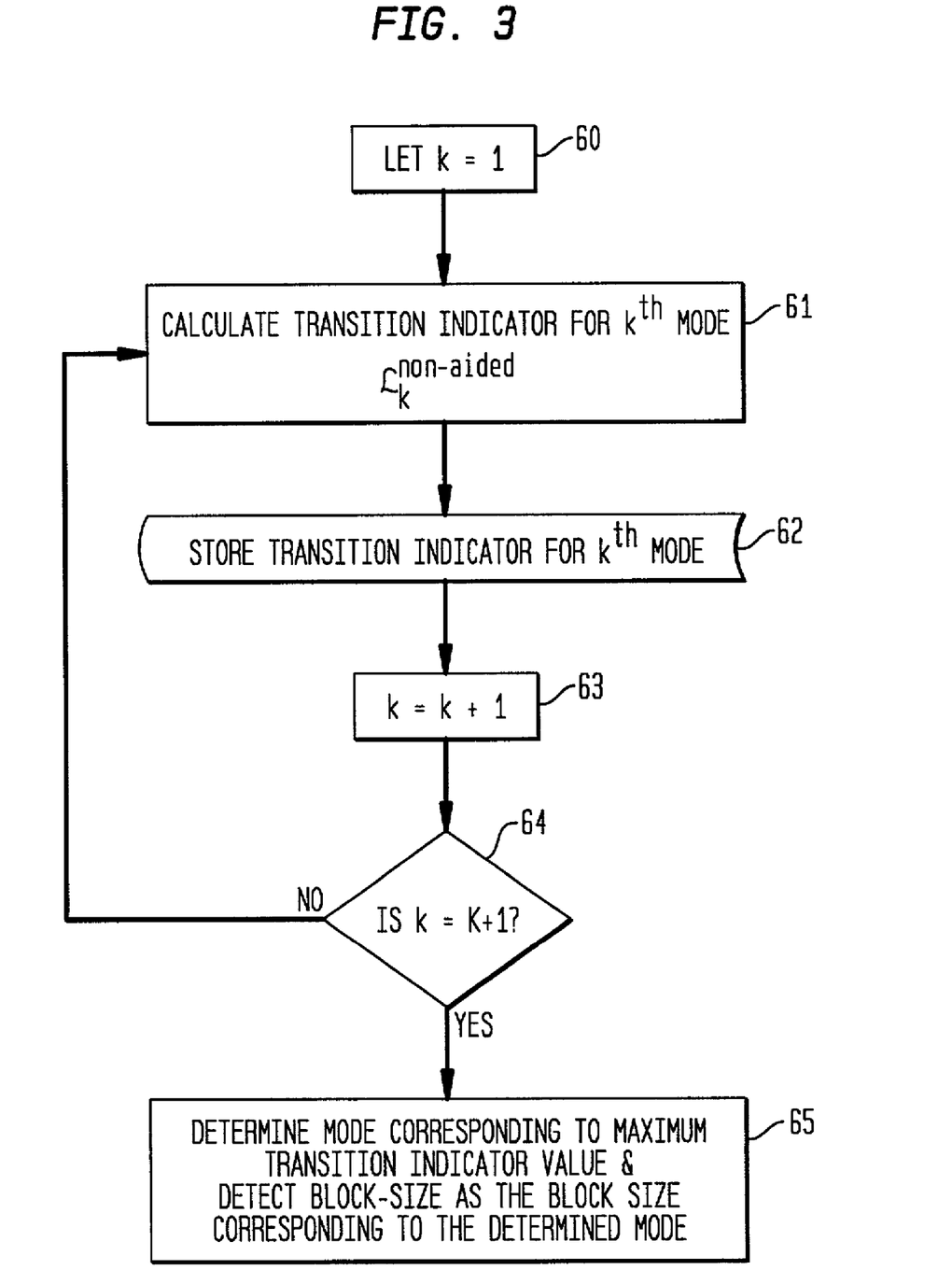
FIG. 3 is a flowchart of a method for the non-aided block-size detection embodiment.

FIG. 3 illustrates the procedure for implementing a ML detection algorithm for the non-aided detection case. The steps 60-65 are nearly identical to steps 50-55 in FIG. 2, which illustrates the procedure for the aided detection embodiment. The only difference is in step 61, where a different log-likelihood function is used to calculate the transition indicator for non-aided detection case. In an exemplary embodiment, the transition indicator is calculated according to:

$$\mathcal{L}_k^{non-aided} = \sum_{i=1}^{L_k} \log\left[\sum_{m=0}^{M-1} \exp\left(-\frac{1}{2\sigma_W^2} |y_i - \alpha_i |x_i| e^{-j2\pi m/M}|^2\right)\right] + \quad (11)$$

$$\sum_{i=L_k+1}^{L_{max}} \log\left[M \exp\left(-\frac{|y_i|^2}{2\sigma_W^2}\right)\right].$$

By careful examination of eq. (11), one can see that the performance of the non-aided algorithm depends on the differences in the block-size values, rather than on their absolute values. This is because the data-dependence of the blocks has been removed by summing over the possible M phases in the MPSK constellation, as a result of conditioning the likelihood function on knowing the signal amplitude, but not the phase.

Finally, since the formula for $\mathcal{L}^{non-aided}$ in eq. 11 may cause a complexity concern for some practical implementations, e.g., DSP implementations with limited processing power, there are two additional alternatives, which are not based on the ML principle, but have a monotonical relationship with $\mathcal{L}^{non\text{-}aided}$ and are easier to compute than $\mathcal{L}^{non\text{-}aided}$. The price is clearly a degradation in performance. The alternative forms for $\mathcal{L}^{non\text{-}aided}$ that could be used are:

$$\mathcal{L}AbsAbs = -\sum_{i=1}^{L_{max}} |(|y_i| - |\alpha_i x_i|)|, \quad (12)$$

and $$\mathcal{L}SqrAbs = -\sum_{i=1}^{L_{max}} (|y_i| - |\alpha_i x_i|)^2. \quad (13)$$

Thus $$\mathcal{L}_k^{AbsAbs} = -\sum_{i=1}^{L_k} |(|y_i| - |\alpha_i A|)| - \sum_{i=L_k}^{L_{max}} |y_i| \quad (14)$$

and $$\mathcal{L}_k^{SqrAbs} = -\sum_{i=1}^{L_k} (|y_i| - |\alpha_i A|)^2 - \sum_{i=L_k}^{L_{max}} |y_i|^2. \quad (15)$$

According to the present invention, each of the aided and non-aided detection methods described above can be used in one of two ways. The first is to estimate the block-size based only on the outcome of the method. This is possible when the operating SNR yields a satisfactory "one-shot" detection error probability. Hence, no further processing is needed to refine the detection decision.

The other way is to use the method as a good "coarse" estimate of the block-size. This occurs when the operating SNR does not yield a satisfactory "one-shot" detection error probability, but it still guarantees a high probability of successfully estimating the block-size within a suitable range, i.e., the method provides a good guess of only few potential block-size candidates, instead of scanning all possible candidates. Then, the receiver can use a more accurate detection technique, however more complex, to further enhance the decision and narrow down the number of potential candidates to only one successful candidate, with a satisfactory detection error probability.

Applications of the Present Invention to 3GPP UMTS

Figure 5:
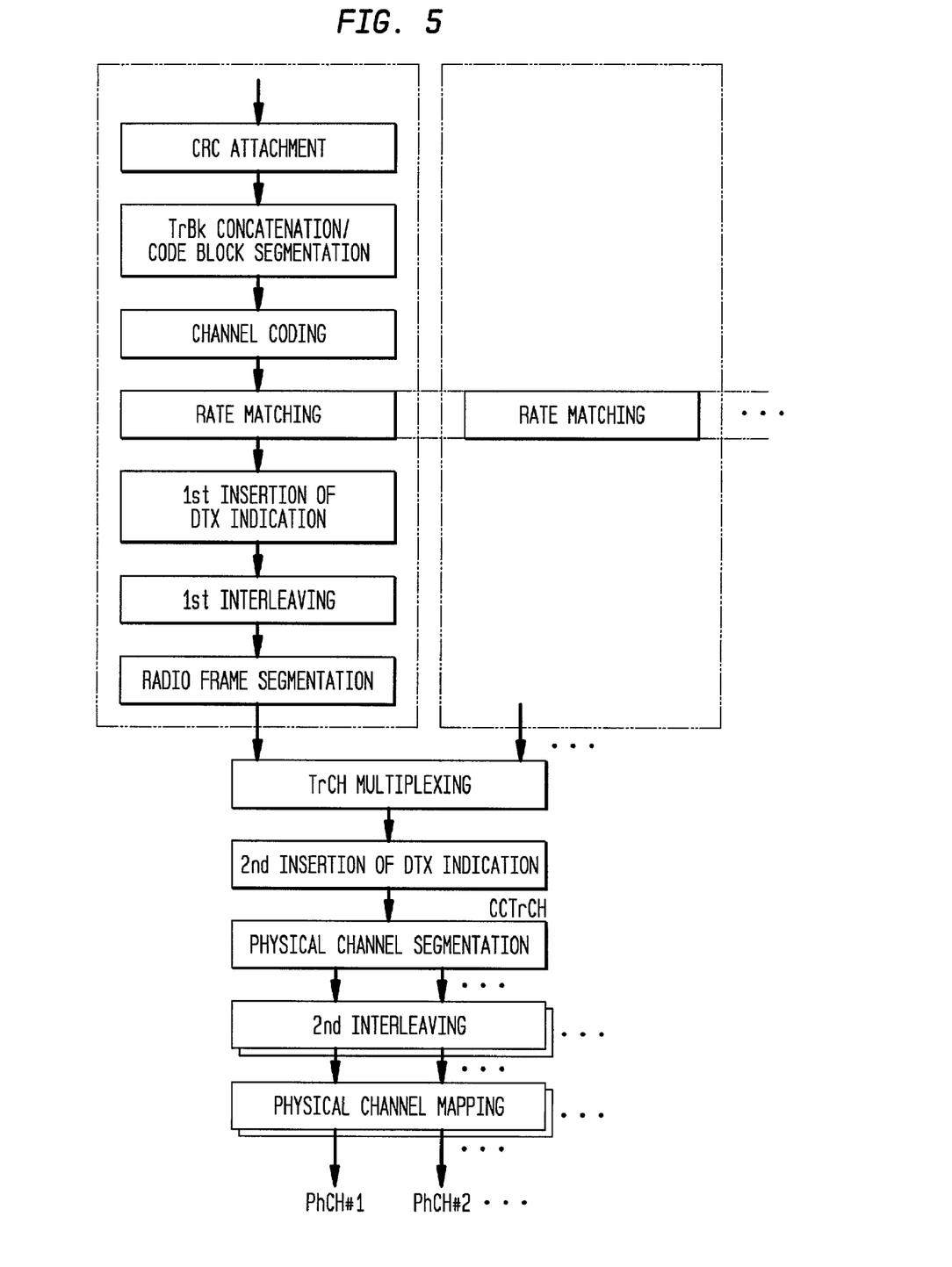
FIG. 5 is a block diagram for a transport channel multiplexing structure for downlink in 3GPP UMTS.

In a further exemplary embodiment, the above-described block-size detection method of the present invention is applied to a 3GPP UMTS system. A flow diagram of the Down-link Transport Channel Multiplexing and Coding process in 3GPP UMTS is shown in FIG. 5. As seen from the figure, each transport channel goes through a number of processes including coding, interleaving, etc., and then several transport channels are multiplexed to form a "Coded Composite Transport Channel (CCTrCH)." Then, control information is added and the overall signal is mapped onto physical channels (called Dedicated Physical Channels) for transmission.

Each transport channels is associated with a Transfer Format (TF), which depends on the type of data (e.g., video, speech, Internet, etc.) and the associated transfer rate. Accordingly, each set of multiplexed transport channels corresponds to a specific combination of transport formats, i.e., a "Transport Format Combination" (TFC).

Figure 6:
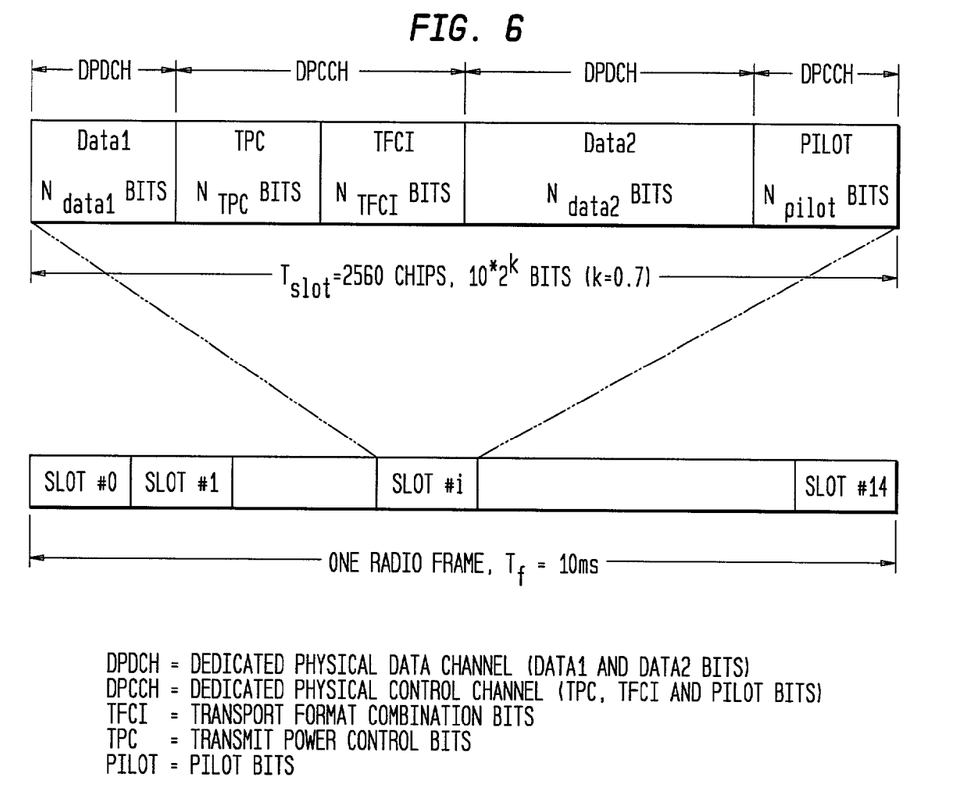
FIG. 6 illustrates a frame structure for downlink Dedicated Physical Channel (DPCH) in 3GPP UMTS.

FIG. 6 shows the physical frame and slot structures for the down-link Dedicated Physical Channel (DPCH) in UMTS. In FIG. 6, the DPDCH refers to those parts of the CCTrCH that have been mapped onto that specific slot. The details of the operations shown in FIG. 5 are found in the UMTS specifications. These specifications also provide details on Transport Formats in UMTS, Transport Channels in UMTS, and Spreading and Modulation in UMTS.

Focusing on the first DTX (Discontinuous Transmission) insertion operation of FIG. 5, DTX symbols are inserted, or stuffed, after the information symbols in order to fill the gap between the maximum possible block-size for the corresponding transport channel and the current block-size of the transmitted transport channel. The number of DTX symbols required for each transport channel is dependent on its transport format. Since DTX symbols carry no information, it is most preferred that they also carry no power. Hence, prior to transmission, power at locations where DTX symbols exist (e.g., after interleaving, multiplexing, . . . etc.) is set to zero. Then, symbols are serial-to-parallel converted, i.e., mapped onto the I and Q rails to form a 2-D (quadrature) signal.

For example, when a DTX symbol on the I-rail is combined with a Q-rail information symbol of value b (which is antipodal, i.e., b=1, for binary 1 and b=−1 for binary 0.), in order to form a complex-valued transmitted symbol, the transmitted complex-valued symbol will take on the form x=A×(0.0+jb), where A corresponds to the required transmission power level. Next, the symbols on each rail are spread by the spreading and scrambling codes as defined by 3GPP.

At the receiver, the I and Q rails are separated and despread. Then, the received symbols over the I and Q rails are parallel-to-serial converted, i.e., re-arranged in series to form a 1-D (scalar) signal again. The signal then goes through the inverse of the transmitter operations shown in FIG. 5 in order to decode the various transport channels. It should be noted that when carrying out receiver operations (i.e., the inverse of transmitter operations), the symbols remain "soft" until they are decoded using convolutional (Viterbi) or Turbo decoders, which are the two coding schemes specified by 3GPP UMTS.

In general, the number of inserted DTX bits per transport channel can vary from one transmission to the other. Thus, the receiver needs to know how many DTX symbols have been inserted in order to remove such symbols and properly decode the received signal. In other words, the receiver needs to know the Transport Format Combination. In order to detect the transport format, 3GPP standards specify two methods for such detection. The first is by explicitly transmitting a Transport Format Combination Indicator (TFCI), which is transmitted as part of the control information on the physical channels. The other method is by Blind Transport Format Detection (BTFD), which is used when no TFCI is transmitted. Based on the mechanism of the DTX insertion process described above, it is clear that the problem of blind transport format detection simply translates into the problem of blind block-size detection; the solution for which has been described above.

Figure 7:
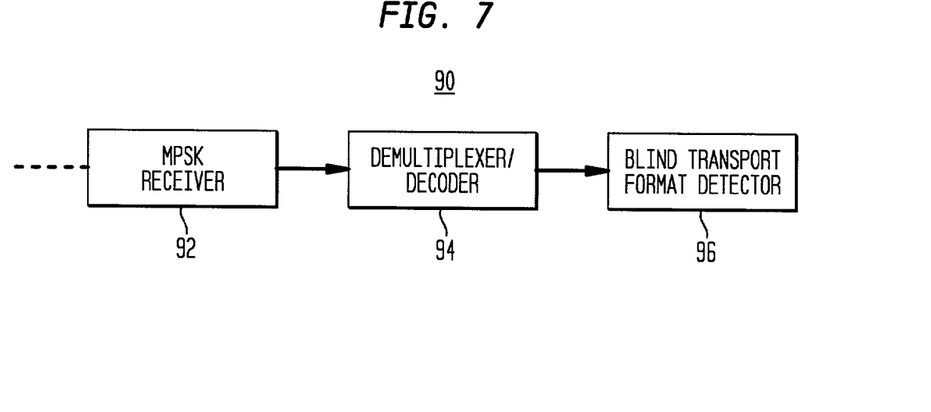
FIG. 7 is a block diagram of a data receiving system implementing Blind Transport Format Detection (BTFD) in 3GPP UMTS.

FIG. 7 illustrates a data receiving system implementing BTFD in a 3GPP UMTS system, according to the present invention. A data transmission is received via DPCH by the MPSK receiver 92. In the case of a WCDMA system, the receiver 92 may comprise a RAKE receiver, which demodulates the received signal. The demodulated signal is then processed by the demultiplexer/decoder 94, which processes the data transmission to extract and demodulate the Coded Composite Transport Channel (CCTrCH) into the separate transport channels. According to an exemplary embodiment, the demultiplexer/decoder 94 performs the inverse of each transmitter operation described above with respect to FIG. 1.

The blind transport format detector 96 performs the BTFD algorithm of the present invention on a transport channel. The blind transport format detector 96 may be implemented as any combination of hardware and software components for calculating the transition indicators and determining the block size of the transport channel, in either the aided or non-aided embodiments described above. Based on the detected block size, the transport format of the transport channel is determined.

In an exemplary embodiment, the blind transport format detector 96 need only determine the block size of one of the transport channels, which is a pre-designated "guiding channel," in order to determine the TFC of the entire data transmission. In this embodiment, the transport format of the guiding channel has a one-to-one correspondence to the possible TFCs of the data transmission. An example of this embodiment will be described below in connection with the Adaptive Multi-Rate (AMR) speech codec specifications in UMTS.

AMR is the service most likely to require blind block-size detection in 3GPP. Three Dedicated Transport Channels (DCHs), namely, DCH1, DCH2 and DCH3, are multiplexed to form a dedicated Coded Composite Transport Channel (CCTrCH), where DCH1, DCH2 and DCH3 are assigned to speech codec Classes A, B, and C, respectively. Also, there are 8 codec modes as shown in Table 1 below.

TABLE 1

AMR Modes

| Codec mode | Class A (# of bits) | Class B (# of bits) | Class C (# of bits) |
|---|---|---|---|
| 1 | 81 | 103 | 60 |
| 2 | 65 | 99 | 40 |
| 3 | 75 | 84 | 0 |
| 4 | 61 | 87 | 0 |
| 5 | 58 | 76 | 0 |
| 6 | 55 | 63 | 0 |
| 7 | 49 | 54 | 0 |
| 8 | 39 | 56 | 0 |

The block-sizes of the A, B and C data blocks (i.e., their boundaries) are unknown to the receiver. However, for the AMR application, the receiver knows that the combination {A, B, C}, i.e., the TFC, must be one of only 8 possible modes as shown in Table 1 above. Therefore, the transport channel corresponding to Class A, which has a block-size that belongs to the set {81, 65, 75, 61, 58, 55, 49, 39} is selected as a guiding channel, which is to be explicitly detected using the BTFD technique.

For the purposes of this example, the AMR mode of a data transmission is determined according to the aided detection embodiment, using the Class A transport channel as the guiding channel. An all-ones training pattern is established for each of the block sizes of Class A. The length $L'_k$ for each of the k=1 ... 8 all-ones training sequences must be one-to-one mapped to each of the set of Class A block sizes. For example, the value $L'_k$ for each mode k may be obtained by subtracting the difference 39 (the smallest data block size in Class A) from the corresponding $L_k$. Therefore, the number of ones $L'_k$ in the training pattern belongs in the set {42, 36, 26, 22, 19, 16, 10, 0}.

After the $L'_{max}$ (known to the receiver) symbols in the training sequence have been received, the receiver will then calculate the transition indicator for each of the k modes. Therefore, if the highest transition indicator in the above example corresponds to k=3, the receiver will determine that $L'_k=26$ ones has been transmitted in the training pattern. Accordingly, the receiver will further determine that the actual data block size is 65. The receiver can then look up Table 1 to detect that the TFC of the transmitted data corresponds to AMR codec mode 2.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

I claim:

1. A method for estimating a number of information symbols in a received data transmission, the method comprising:
   determining a transition indicator for at least one symbol based on the data transmission, the data transmission including a sequence of information symbols followed by zero or more non-information symbols; and
   estimating a number of information symbols based on the transition indicator, the transition indicator, indicating a likelihood that the corresponding symbol is a last information symbol in the sequence of information symbols of the data transmission.

2. The method of claim 1, wherein
   the non-information symbols are zero-power symbols, and
   the determining step includes,
      determining a noise parameter corresponding to a total noise level in the data transmission up to, and including, the corresponding symbol;
      determining a power parameter corresponding to a total power level of a remainder of the data transmission following the corresponding symbol;
      calculating the transition indicator by combining the noise parameter and power parameter.

3. The method of claim 1, wherein the determining step determines the transition indicator, $\pounds_k$, for the corresponding symbol according to:

$$\pounds_k = -\sum_{i=1}^{L_k} \log\left[\sum_{m=0}^{M-1} \exp\left(-\frac{1}{2\sigma_W^2}|y_i - \alpha_i A e^{-j2\pi m/M}|^2\right)\right] - \sum_{i=L_k+1}^{L_{max}} \log\left[M \exp\left(\frac{|y_i|^2}{2\sigma_W^2}\right)\right]$$

where
   $L_k$=number of symbols in the data transmission received prior to, and including, the corresponding symbol,
   $L_{max}$=maximum possible number of symbols within the data transmission,
   $y_i$=$i^{th}$ received symbol in the data transmission,
   $\alpha_i$=predetermined complex-valued fading variable for $y_i$,
   A=predetermined power magnitude of an information symbol in an "on" state,
   M=number of phases of an MPSK modulation scheme used in transmitting the data transmission,
and
   $\sigma_W^2$=variance of a complex-valued Additive White Gaussian Noise (AWGN) variable.

4. The method of claim 1, wherein
   the determining step determines a transition indicator for each of a predetermined set of candidate symbols in the data transmission, and
   the estimating step includes,
      identifying the candidate symbol corresponding to a maximum one of the transition indicators, and estimating the number of information symbols as the number of symbols received prior to, and including, the identified candidate symbol.

5. The method of claim 1, wherein
the data transmission includes a training sequence including one of k=1 . . . K possible patterns, each of the possible patterns including a sequence of known symbols followed by zero or more zero-power symbols, a placement of a first zero-power symbol in the training sequence being determinative of the included pattern, and
the transition indicator indicates a likelihood that the next symbol is a first one of the zero-power symbols in the training sequence.

6. The method of claim 5, wherein the determining step determines the transition indicator, $£_k$, for the corresponding symbol according to:

$$£_k = -\sum_{i=1}^{L'_k} |y'_i - \alpha'_i \xi_{i,k}|^2 - \sum_{i=L'_k+1}^{L'_{max}} |y'_i|^2$$

where
$L'_k$=number of symbols in the training sequence received prior to, and up to, the corresponding symbol,
$L'_{max}$=maximum possible number of symbols within the training sequence,
$y'_i$=$i^{th}$ received symbol in the training sequence,
$\alpha'_{i,k}$=predetermined complex-valued fading variable for $y'_i$ in a training sequence corresponding to the $k^{th}$ possible pattern, and
$\xi'_{i,k}$=known symbol corresponding to the $i^{th}$ data symbol in a training sequence corresponding to the $k^{th}$ possible pattern.

7. The method of claim 5, wherein
each of the possible patterns has a one-to-one correspondence to a predetermined number of information symbols,
the determining step determines a transition indicator for each of a predetermined set of candidate symbols in the training sequence, and
the estimating step includes,
    identifying the candidate symbol corresponding to a maximum one of the transition indicators,
    determining the pattern of the training sequence based on a placement of a symbol immediately following the identified candidate symbol, and
    estimating the number of information symbols as the predetermined number of information symbols corresponding to the determined pattern.

8. A data receiving apparatus comprising:
a receiver configured to receive a MPSK data transmission;
means for extracting a guiding channel from the data transmission, the guiding channel including a sequence of information symbols followed by zero or more non-information symbols;
means for calculating a transition indicator for at least one symbol based on the guiding channel, the means for calculating the transition indicator further including means for calculating a likelihood that the corresponding symbol is the last information symbol in the sequence of information symbols of the guiding channel;
means for estimating a number of information symbols based on the transition indicator.

9. The data receiving apparatus of claim 8, wherein
the receiver comprises a third generation Universal Mobile Telecommunications Service (UMTS) receiver, and
the means of extracting a guiding channel includes,
    a demultiplexer configured to demultiplex the data transmission into one or more UMTS transport channels; and
    means for selecting the guiding channel from the one or more UMTS transport channels.

10. The data receiving apparatus of claim 9, further comprising
means for detecting a UMTS Transport Format Combination (TFC) of the data transmission based on the estimated number of information symbols.

11. The data receiving apparatus of claim 10, wherein
the non-information symbols are zero-power symbols, and
the means for calculating includes,
    means for determining a noise parameter corresponding to a total noise level in the guiding channel up to, and including, the corresponding symbol;
    means for determining a power parameter corresponding to a total power level of a remainder of the guiding channel following the corresponding symbol;
    means for calculating the transition indicator based on the noise parameter and the power parameter.

12. The data receiving apparatus of claim 8, wherein
the non-information symbols are zero-power symbols, and
the means for calculating includes,
    means for determining a noise parameter corresponding to a total noise level in the guiding channel up to, and including, the corresponding symbol;
    means for determining a power parameter corresponding to a total power level of a remainder of the guiding channel following the corresponding symbol;
    means for calculating the transition indicator based on the noise parameter and the power parameter.

13. The data receiving apparatus of claim 8, wherein
the means for determining determines a transition indicator for each of a predetermined set of candidate symbols in the guiding channel, and
means for estimating includes,
    means for identifying the candidate symbol corresponding to a maximum one of the transition indicators, and
    means for estimating the number of information symbols as the number of symbols received prior to, and including, the identified candidate symbol.

14. The data receiving apparatus of claim 8, wherein
the guiding channel includes a training sequence including one of k=1 . . . K possible patterns, each of the possible patterns including a sequence of known symbols followed by zero or more zero-power symbols, a placement of a first zero-power symbol in the training sequence being determinative of the included pattern, and
the transition indicator indicates a likelihood that the next symbol is a first one of the zero-power symbols in the training sequence.

15. The data receiving apparatus of claim 14, wherein the means for calculating includes,
    means for determining a noise parameter corresponding to a total noise level in the guiding channel up to, and including, the corresponding symbol;
    means for determining a power parameter corresponding to a total power level of a remainder of the guiding channel following the corresponding symbol;
    means for calculating the transition indicator by combining the noise parameter and power parameter.

16. The data receiving apparatus of claim 14, wherein
each of the possible patterns has a one-to-one correspondence to a predetermined number of information symbols,
the means for determining determines a transition indicator for each of a predetermined set of candidate symbols in the training sequence, and
the means for estimating includes,
- means for identifying the candidate symbol corresponding to a maximum one of the transition indicators,
- means for determining the pattern of the training sequence based on a placement of a symbol immediately following the identified candidate symbol, and
- means for estimating the number of information symbols as the predetermined number of information symbols corresponding to the determined pattern.

17. A third generation Universal Mobile Telecommunications Service (UMTS) data receiving system comprising:
a receiver configured to receive a Wideband Code-Division Multiple Access (WCDMA) data transmission;
a demultiplexer configured to demultiplex the received data transmission into one or more UMTS transport channels;
means for selecting a guiding channel from the one or more UMTS transport channels, the guiding channel including a sequence of information symbols followed by zero or more non-information symbols;
means for identifying an information symbol in the guiding channel having a maximum likelihood of being the last information symbol in the sequence of information symbols;
means for determining a transport format of the guiding channel based on the identified information symbol.

18. The apparatus of claim 17, further comprising
means for determining a Transport Format Combination (TFC) of the received data transmission based on the determined transport format of the guiding channel.

* * * * *